US007861682B2

(12) United States Patent
Berger

(10) Patent No.: US 7,861,682 B2
(45) Date of Patent: Jan. 4, 2011

(54) SYSTEMS AND METHODS FOR MANAGING CAMSHAFT TORSIONAL LOADING

(75) Inventor: Alvin Henry Berger, Brownstown, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 524 days.

(21) Appl. No.: 11/924,569

(22) Filed: Oct. 25, 2007

(65) Prior Publication Data

US 2009/0107434 A1  Apr. 30, 2009

(51) Int. Cl.
*F01L 1/04* (2006.01)

(52) U.S. Cl. .................. 123/90.6; 123/90.44; 123/495; 74/569

(58) Field of Classification Search .............. 123/90.39, 123/90.44, 90.6, 90.27, 90.31, 445, 446, 123/495; 29/888.1; 74/569
See application file for complete search history.

(56) References Cited

U.S. PATENT DOCUMENTS

| | | | | |
|---|---|---|---|---|
| 5,040,500 A | * | 8/1991 | Reece | |
| 5,107,805 A | * | 4/1992 | Butterfield et al. | 123/90.17 |
| 5,823,091 A | * | 10/1998 | Collingborn | |
| 5,899,181 A | * | 5/1999 | Kurata et al. | 123/90.17 |
| 7,008,198 B2 | * | 3/2006 | Lee et al. | |
| 7,055,480 B2 | * | 6/2006 | Kusaka et al. | 123/90.6 |
| 2005/0207912 A1 | * | 9/2005 | Lolli et al. | |

FOREIGN PATENT DOCUMENTS

| | | | |
|---|---|---|---|
| FR | 2688563 | * | 9/1993 |
| JP | 7-332026 | | 12/1995 |

* cited by examiner

Primary Examiner—Ching Chang
(74) Attorney, Agent, or Firm—Julia Voutyras; Brooks Kushman P.C.

(57) ABSTRACT

Systems and methods for managing camshaft dynamic loads associated with actuation of a camshaft-driven auxiliary device in a multiple-cylinder internal combustion engine apply positive and negative torque to the camshaft in a phased relationship relative to actuation of the auxiliary device and optionally relative to actuation of intake or exhaust valves operated by the camshaft.

18 Claims, 6 Drawing Sheets

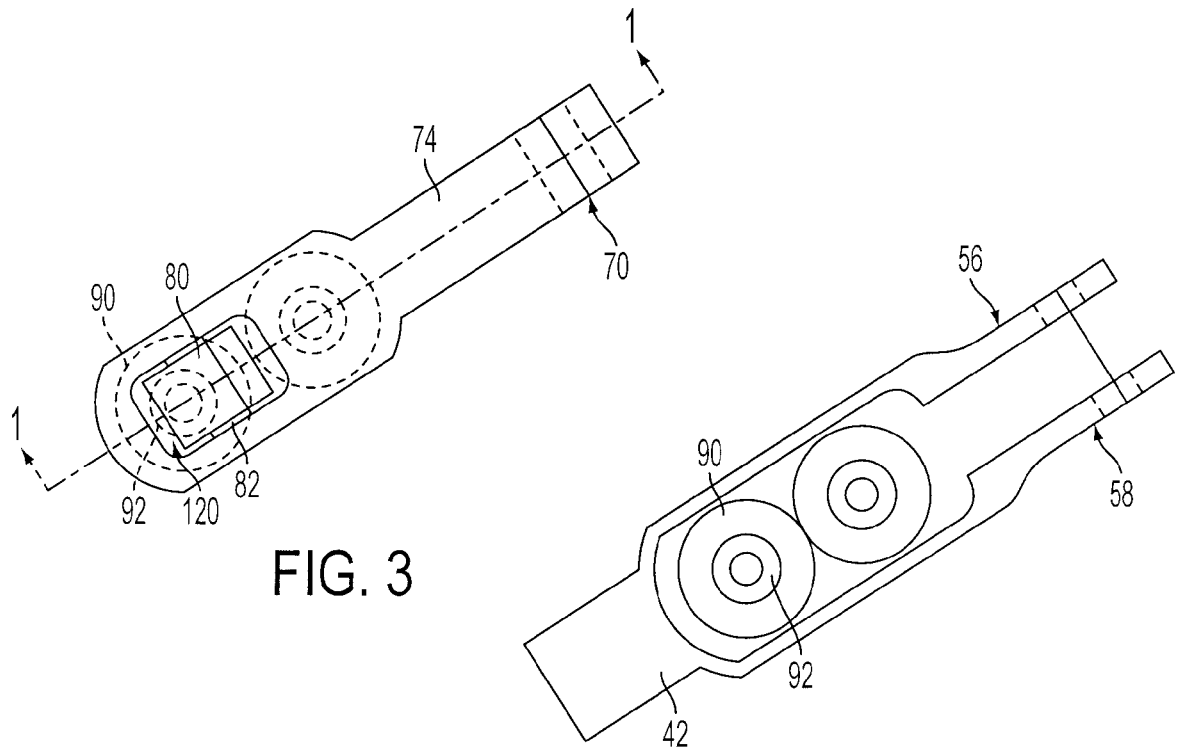
FIG. 3
FIG. 4
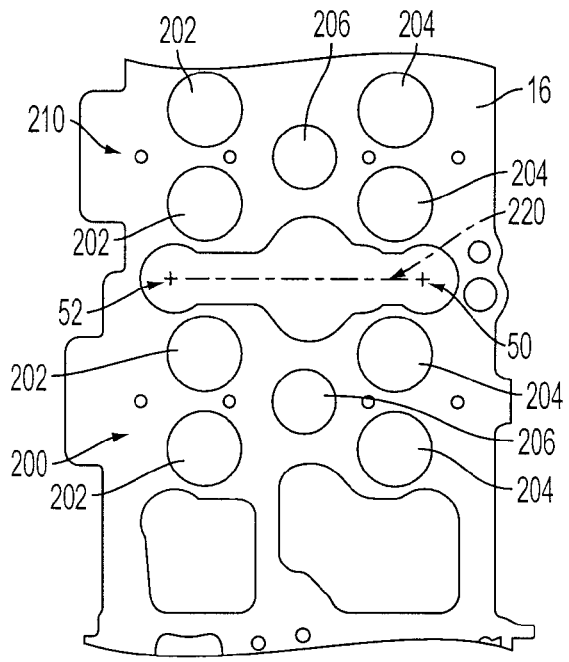
FIG. 5

SYSTEMS AND METHODS FOR MANAGING CAMSHAFT TORSIONAL LOADING

BACKGROUND

1. Technical Field

The present disclosure relates to systems and methods for managing camshaft torsional loading in internal combustion engines having one or more camshaft driven engine accessories, such as a fuel pump or water pump.

2. Background Art

An internal combustion engine camshaft may be used to drive various engine accessories or auxiliary equipment, such as a fuel pump or water pump in addition to the intake or exhaust valves it actuates. Engines that use fuel at high pressure, such as direct injection engines and/or those using a single high-pressure fuel pump to supply all engine cylinders, often stroke the fuel pump plunger multiple times for every revolution of the camshaft. As such, the camshaft includes a cam with as many lobes as the number of strokes required by the fuel pump or other auxiliary device to provide the desired pressure and flow characteristics. Depending upon the particular valvetrain and engine configuration, optimal indexing or phasing between the cam lobes actuating the intake/exhaust valves and the cam lobes actuating the auxiliary device(s) may not be possible resulting in uneven or unbalanced torsional loading of the camshaft. This may adversely impact various other engine components, such as the camshaft chain drive system, for example. In addition, such torsional loading may contribute to undesirable noise, vibration, and harshness.

Various types of devices have been used to reduce the unbalanced torsional loading of the camshaft associated with intake/exhaust valve actuation. For example, U.S. Pat. No. 5,040,500 and French Pat. No. 2688563 disclose a balancing mechanism that operates on a dedicated cam to moderate dynamic loading associated with valve actuation. The present disclosure recognizes the desirability of managing torsional loading of the camshaft associated with actuation of an auxiliary device, such as a fuel pump, in addition to the loading associated with the intake or exhaust valves it actuates, especially in a configuration where the valve actuation and auxiliary device stroking cannot be phased to balance each other.

SUMMARY

Systems and methods for managing camshaft dynamic loads associated with actuation of a camshaft-driven auxiliary device in a multiple-cylinder internal combustion engine apply positive and negative torque to the camshaft in a phased relationship relative to actuation of the auxiliary device and optionally relative to actuation of intake or exhaust valves operated by the camshaft.

In a conventional camshaft drive, the engine's camshaft drive mechanism transfers torque from the crankshaft to force rotation of the camshaft. This nominal torque transfer from the crankshaft through the camshaft to the valvetrain in the direction of normal rotation is considered to be positive camshaft driving torque. At times of the engine operating cycle when energy from the valvetrain is released and produces a torque on the camshaft that transfers back through the camshaft drive mechanism and tends to force rotation of the crankshaft in its direction of normal rotation, the camshaft driving torque is considered to be negative.

In one embodiment, a balancer mechanism resiliently contacts a cam on the camshaft in a phased relationship with the auxiliary device. The balancer mechanism may include one or more springs to add torque to the camshaft (producing a reduction of positive driving torque in the camshaft drive mechanism) as the auxiliary device receives torque from the camshaft during the power stroke of the auxiliary device (producing an increase in the positive driving torque in the camshaft drive mechanism). Likewise, the balancer mechanism receives torque from the camshaft (positive camshaft drive torque) when the auxiliary device adds torque to the camshaft (negative camshaft drive torque).

One embodiment of a spring-biased device for managing torsional loading of the camshaft according to the present disclosure includes a base securely mounted on the cylinder head with a pivot arm having a first end pivoting between generally upward extending risers of the base and a second end with a rotatably mounted roller follower that contacts a multiple-lift (or multiple-lobed) cam on the intake camshaft that drives the auxiliary device. A plurality of springs extending between the pivot arm and the base alternately apply positive/negative torque to the camshaft through the roller follower as the multiple-lift cam rotates with the camshaft and drives the auxiliary device. In this embodiment, the axial location of the auxiliary device is the same as that of the balancer mechanism so that both may be actuated by the same multiple-lift cam on the intake camshaft. In addition, the upward extending risers may be used to provide a secondary attachment point to secure the auxiliary device to the cylinder head.

In another embodiment of the present disclosure, two multiple-lift cams are provided: one for driving a fuel pump and another for actuating a balancer mechanism. In this embodiment, the fuel pump is axially aligned with and operated by the first multiple-lift cam, which is axially displaced along the camshaft relative to the second multiple-lift cam that actuates the balancer mechanism. This allows the multiple-lift cam associated with the balancer mechanism to have a different profile relative to the fuel pump cam so that it can better manage torque pulsations associated with actuation of the fuel pump. The dedicated balancer cam could also be shaped to manage torsional loading associated with any other camshaft-driven auxiliary devices in addition to the torsional loading associated with actuation of the intake or exhaust valves.

Management of torsional loading of a camshaft associated with operation of an auxiliary device according to the present disclosure provides various advantages. For example, managing torsional loading associated with one or more camshaft-driven auxiliary devices may reduce noise, vibration, and harshness while improving durability of associated engine components, such as the camshaft chain drive assembly, for example. Actuation of a balancer mechanism by the same cam that drives the auxiliary device allows for more compact packaging of the system and may provide an additional attachment point for the auxiliary device to reduce vibration during operation. Actuation of a balancer mechanism by a dedicated cam allows optimization of the balancer cam profile to better manage torsional loading associated with the auxiliary device and provides the ability to counter torques associated with intake or exhaust valve actuation in addition to torques associated with the auxiliary device.

The above advantages and other advantages and features of the present disclosure will be readily apparent from the following detailed description of the preferred embodiments when taken in connection with the accompanying drawings.

BRIEF DESCRIPTION OF THE DRAWINGS

FIG. 3 is a top view of a pivot arm and roller follower of one embodiment of a balancer mechanism according to the present disclosure;

FIG. 4 is a top view of the base structure, risers, and nested springs of a balancer mechanism of one embodiment according to the present disclosure;

FIG. 5 is a partial plan view of a cylinder head of the multiple-cylinder engine illustrating the axial location of the balancer mechanism and fuel pump of one embodiment according to the present disclosure;

DETAILED DESCRIPTION OF THE PREFERRED EMBODIMENT(S)

As those of ordinary skill in the art will understand, various features of the present disclosure as illustrated and described with reference to any one of the Figures may be combined with features illustrated in one or more other Figures to produce embodiments of the present disclosure that are not explicitly illustrated or described. The combinations of features illustrated provide representative embodiments for typical applications. However, various combinations and modifications of the features consistent with the teachings of the present disclosure may be desired for particular applications or implementations.

Figure 1:
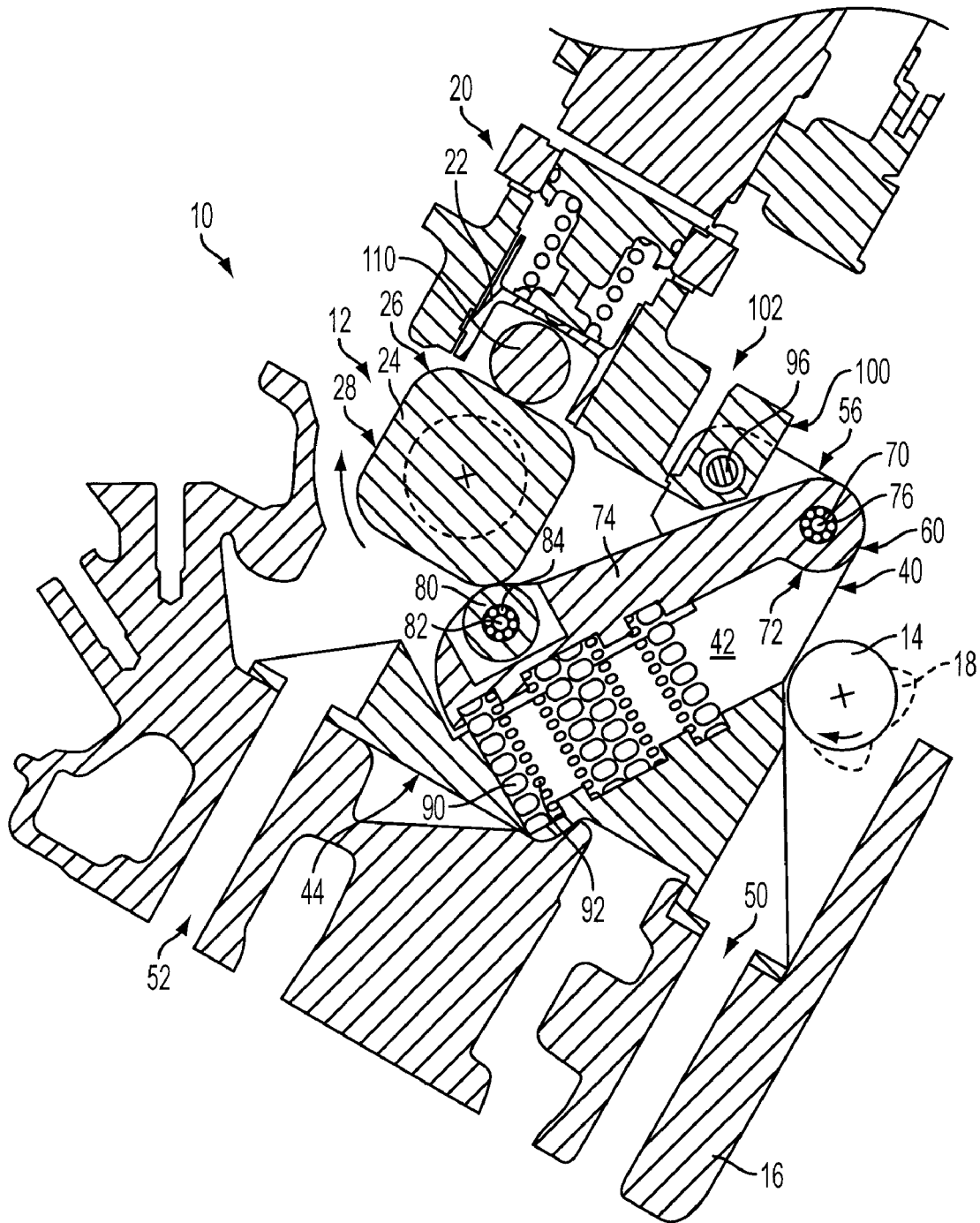
FIG. 1 is a partial cross-section of a multiple-cylinder engine showing a balancer and auxiliary device cam in a position where the balancer mechanism has removed torque from the intake camshaft (positive drive torque) according to one embodiment of the present disclosure.

FIG. 1 is a partial cross-section at an axial or longitudinal location between adjacent cylinders of a multiple-cylinder internal combustion engine 10 including a system for managing camshaft dynamic loads according to the present disclosure. In this representative embodiment, internal combustion engine 10 is a gasoline fueled, spark-ignition, direct-injection, four-valves-per-cylinder, six-cylinder "V-type" engine having an engine block with three cylinders in each of two cylinder banks arranged at an angle relative to one another. Engine 10 has overhead camshafts including intake camshaft 12 having a plurality of intake valve cams for operating corresponding intake valves and an associated variable cam timing (VCT) device for selectively adjusting intake valve timing or phasing in addition to exhaust camshaft 14 having a plurality of exhaust valve cams 18 for operating corresponding exhaust valves associated with each cylinder bank. At least one of intake/exhaust camshafts 12, 14 includes one or more cams for actuating a camshaft-driven auxiliary device 20. Of course, the systems and methods of the present disclosure are not necessarily limited to this particular engine configuration and may be applied to other engine configurations and technologies.

Each cylinder bank includes a cylinder head 16 secured thereto that defines the upper portion of the cylinders and provides support for various engine components including the engine intake/exhaust valves, fuel injectors, and fuel delivery system, for example. A valve cover (not shown) is secured to cylinder head 16 to contain lubricating oil that drains back through associated holes in cylinder head 16 to the engine sump. As previously described, engine 10 includes at least one camshaft-driven auxiliary device 20 having a plunger 22 driven by an associated multiple-lift or multiple-lobed cam 24. In the representative embodiment illustrated in FIG. 1, auxiliary device 20 is a high-pressure fuel pump that supplies high-pressure fuel to fuel injectors via a common rail distribution system for each cylinder bank. Multiple-lift fuel pump cam 24 is disposed on intake camshaft 12 and includes four lobes 26 that extend from a base profile 28 and operate the fuel pump to deliver a desired fuel pressure to the common rail distribution system in response to clockwise rotation of camshaft 12. Of course, other cam configurations may be used depending upon the particular auxiliary device and desired operating parameters. Engine 10 may also include other types of camshaft-driven auxiliary devices in place of, or in addition to a fuel pump, that are driven by the same cam or a different cam on the same camshaft for either intake camshaft 12 or exhaust camshaft 14. For example, engine 10 may include a camshaft-driven water pump in place of, or in addition to, the fuel pump driven by camshaft 12 or camshaft 14.

As also shown in FIG. 1, internal combustion engine 10 includes at least one balancer mechanism 40 in contact with intake camshaft 12 via multiple-lift cam 24 and is positioned in a phased relationship with auxiliary device plunger 22 to manage torsional loading as described in greater detail herein. Balancer mechanism 40 includes a support structure 42 having a base 44 secured to the engine block using cylinder head bolts that extend through corresponding holes 50, 52 of cylinder head 16. At the cylinder head bolt locations, base 44 preferably has a thickness approximately equal to the washers used with various other cylinder head bolts so that the loading profile of the cylinder head/engine block interface and gasket is not significantly altered by addition of balancer mechanism 40. Support structure 42 also includes two risers or support arms 56, 58 (FIG. 4) spaced from each other and extending generally upward from base 44. A finger follower 60 is pivotally secured between support arms 56, 58 by a pin 70 extending therebetween and through a hole in a first end 72 of a pivot arm 74. A plurality of roller or needle bearings 76 disposed about pin 70 provides a durable low friction support for pivot arm 74. The second or opposite end of pivot arm 74 includes a roller 80 rotatably secured to pivot arm 74 by a pin or axle 82 and corresponding needle or roller bearings 84. Roller 80 contacts a corresponding multiple-lobe balancer cam 24 on intake camshaft 12 to apply a positive force (directed toward the center of camshaft 12) on cam 24 resulting in a torque applied to camshaft 12. As camshaft 12 rotates, a lobe 26 contacts roller 80 (FIG. 2) and applies a force directed away from the center of camshaft 12 and against a resilient element, such as one or more springs 90, 92, supporting pivot arm 74. Stated differently, as lobe 26 begins to contact roller 80 (best shown in FIG. 2), balancer device 40 begins to absorb torque from camshaft 12 via one or more springs 90, 92 or other resilient device, such as a hydraulic or pneumatic cylinder or chamber, for example.

In the representative embodiment illustrated in FIG. 1, balancer device 40 includes a plurality of springs 90, 92 disposed between the second end of pivot arm 74 and base 44 of support structure 42. More particularly, two pairs of two coil springs nested one within another are provided to supply the desired resilient force and to facilitate packaging of the device for this particular application and implementation. Other applications or implementations may use a different number or type of springs, or may use another resilient element as previously described. Where nested coil springs are utilized, the nested springs may be wound in opposite directions to avoid entanglement. Support structure 42 and pivot arm 74 may include one or more spring alignment recesses and/or projections to facilitate assembly and retain springs during operation of balancer device 40. Risers or support arms 56 may extend beyond pivot arm 74 and include a through hole with a fastener or pin 96 used to secure a bottom portion or extension 100 of auxiliary device 20 to support structure 42. In the illustrated embodiment, extension 100 includes a hole 102 for receiving a fastener used to secure the cylinder head cover or valve cover (not shown) to engine 10. The illustrated arrangement provides an additional attachment point for auxiliary device 20 and adds rigidity to the system to reduce vibrations associated with operation of auxiliary device 20.

Figure 2:
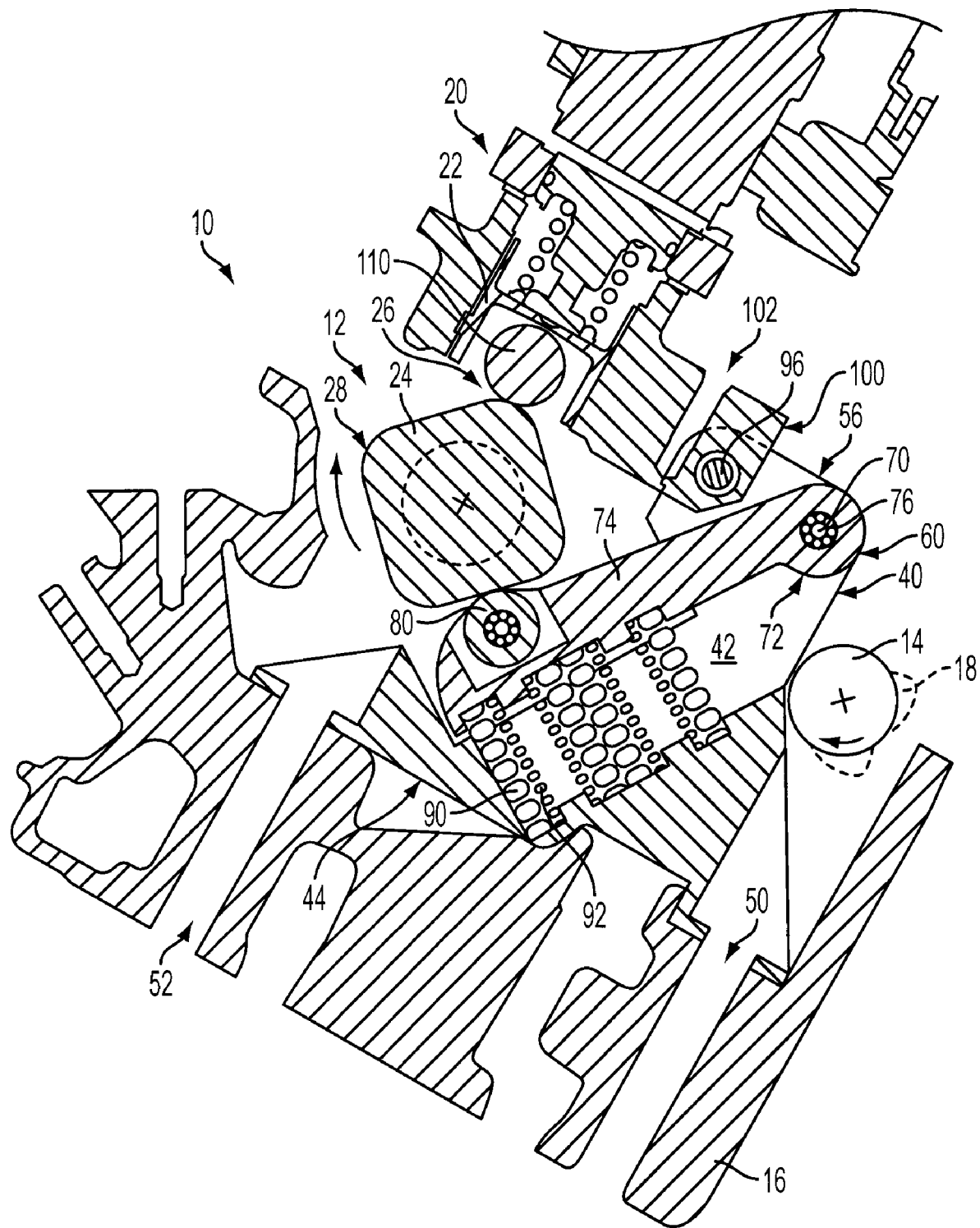
FIG. 2 is a partial cross-section of the embodiment of a multiple-cylinder engine in FIG. 1 showing a cam position where the balancer mechanism has added torque to the intake camshaft (negative drive torque)

Referring now to FIGS. 1 and 2, the phased relationship between actuation of auxiliary device 20 and actuation of balancer device 40 is shown. In this embodiment, the left-hand intake camshaft 12 drives three pairs of intake valves as well as a fuel pump 20 with three intake valve actuation events and four fuel pump actuation events for each camshaft rotation. Balancer mechanism 40 is positioned so that the contact point between cam 24 and roller 80 of pivot arm 74 is displaced by about 132 degrees of clockwise camshaft rotation relative to the contact point between cam 24 and roller 110 associated with fuel pump plunger 22. During operation, torsional loading of camshaft 12 is managed by applying torque to camshaft 12 using resiliently biased cam follower 60 such that an advancing torque is applied to the camshaft 12 (the camshaft transfers negative torque to the balancer) via roller 80 during at least a portion of the rotation of camshaft 12 as a lobe 26 moves plunger 22 upward (FIG. 2), i.e. as plunger 22 applies a retarding torque to (or receives positive torque from) camshaft 12, springs 90, 92 exert a force through roller 80 to apply an advancing torque to cam 24 and camshaft 12. Likewise, balancer mechanism 40 applies a retarding torque to (or receives positive torque from) camshaft 12 during at least a portion of camshaft rotation when fuel pump plunger 22 is moving downward and a lobe 26 compresses springs 90, 92 via roller 80 and pivot arm 74. In the embodiment illustrated in FIGS. 1 and 2, advancing and retarding torques are applied to camshaft 12 by auxiliary device 20 and balancer mechanism 40 via the same cam 26. A camshaft for an alternative embodiment (FIG. 7) includes a dedicated balancer cam, which is axially displaced on the camshaft relative to the cam or cams driving one or more auxiliary devices. Operation of such an alternative embodiment includes applying torque in a phased relationship to the camshaft-driven auxiliary device using a cam follower in contact with a different cam on the camshaft than the cam that drives the auxiliary device.

FIGS. 3 and 4 are plan views of a pivot arm 74 and support structure 42, respectively, of one embodiment of a spring-biased torsional management device according to the present disclosure. During assembly, pivot arm 74 is positioned between risers or support arms 56, 58 and pivotally secured by a pin and roller bearings as previously described. As shown in FIG. 3, pivot arm 74 includes a pocket 120 at one end for receiving roller 80, which is rotatably secured therein by a pin and roller bearings as previously described. One or more springs 90, 92 extend beneath roller 80 to the base of support structure 42.

FIG. 5 is a cross-section parallel to cylinder head 16 through the plane where the fuel pump 20, balancer mechanism 40, and fuel pump/balancer cam 24 centerlines are located to illustrate axial positioning of a balancer mechanism according to one embodiment of the present disclosure. As previously described, cylinder head 16 defines the upper portion of a first cylinder in region 200 and an adjacent cylinder in region 210 with holes for receiving associated intake valves 202, exhaust valves 204, and a fuel injector 206. In this embodiment, balancer mechanism 40 (FIG. 1) is axially disposed generally equidistantly between adjacent cylinders 200, 210 along center line 220, and is secured to the engine block with two cylinder head bolts extending through corresponding holes 50, 52 as previously described with reference to FIG. 1. Of course, the axial positioning of balancer mechanism 40 may vary depending upon the particular application and implementation. However, axial collocation of balancer mechanism 40 and auxiliary device 20 provide various advantages in terms of packaging and operation of both devices using a single cam as previously described.

Figure 6:
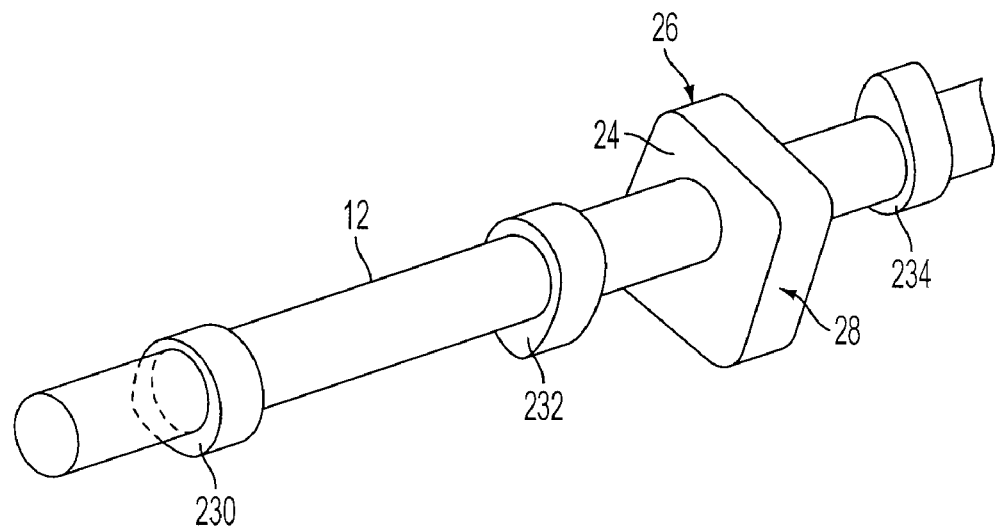
FIG. 6 illustrates a four-lobed multiple-lift cam on an intake camshaft for actuation of a balancer mechanism and fuel pump according to one embodiment of the present disclosure.
Figure 8:
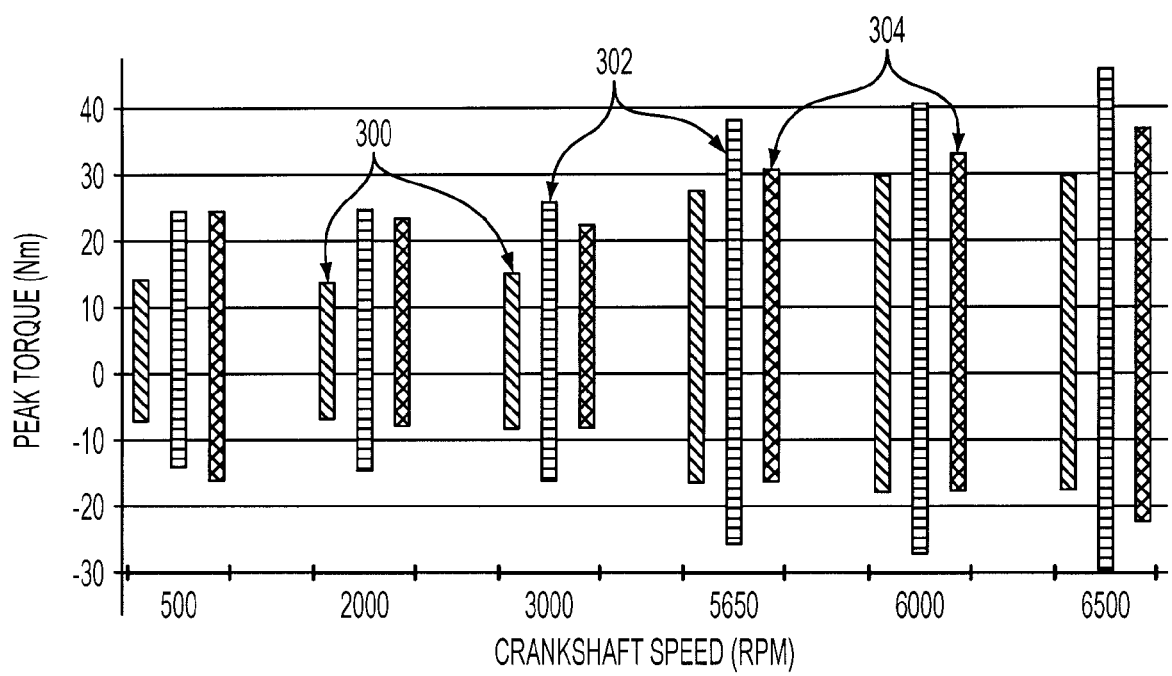
FIG. 8 is a graph of peak positive and negative torques associated with a camshaft-driven fuel pump at various engine speeds that illustrates reduced peak torques associated with use of a balancer mechanism according to one embodiment of the present disclosure.
Figure 9:
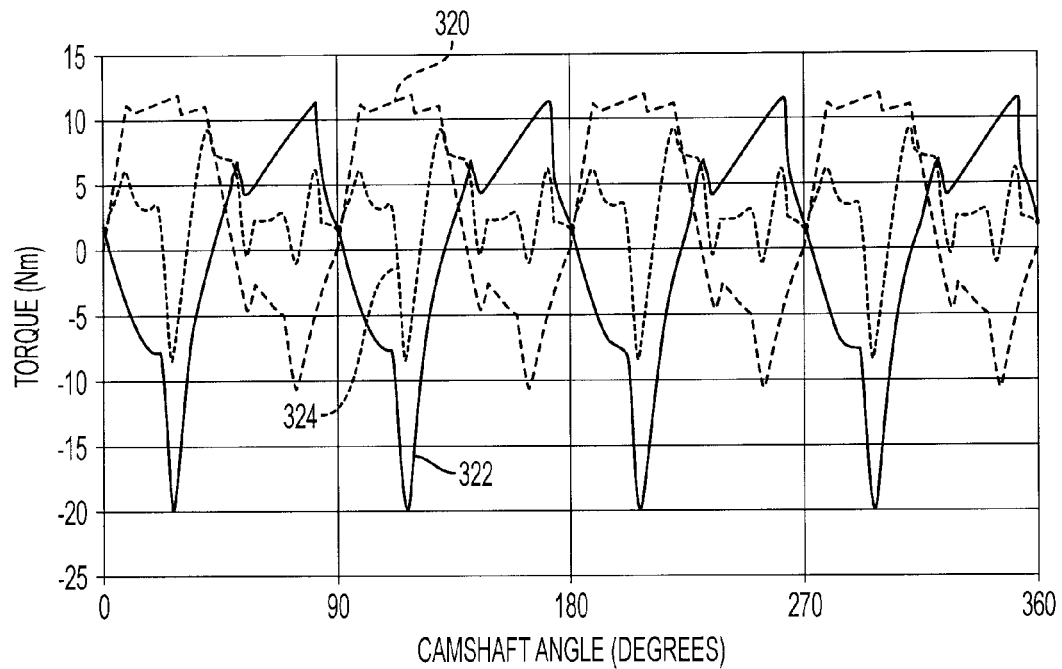
FIGS. 9 and 10 are graphs illustrating torsional load management for an intake camshaft using one embodiment of a balancer mechanism during high-speed operation according to the present disclosure.
Figure 10:
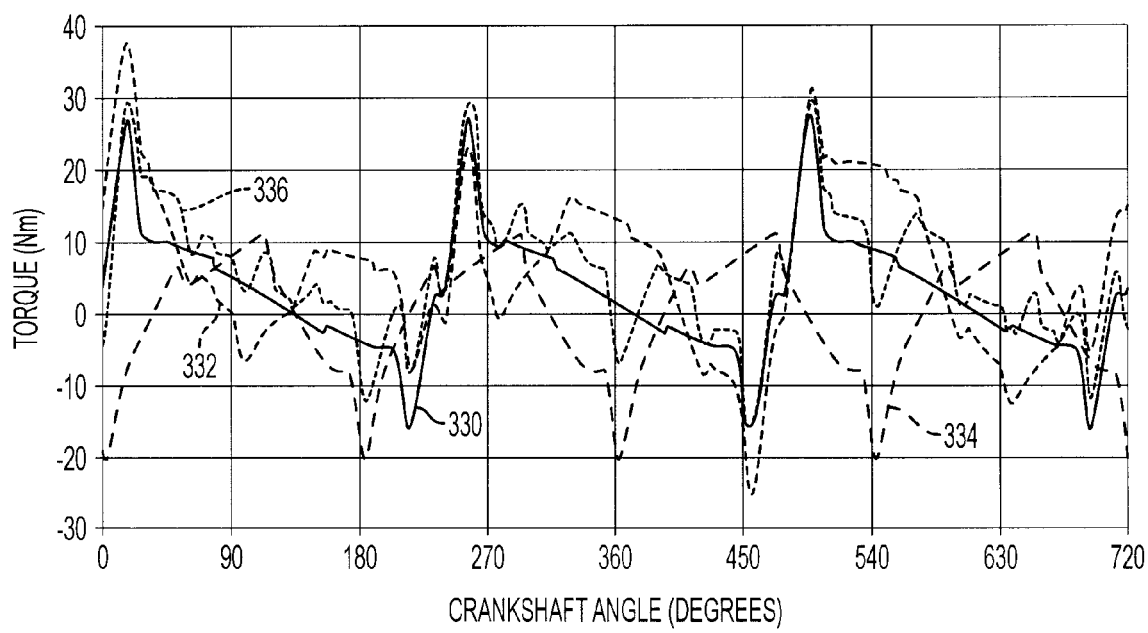

FIG. 6 is a perspective view of a camshaft having a single or common cam for driving an auxiliary device and torsional management device according to the present disclosure. Intake camshaft 12 includes a plurality of intake valve cams 230, 232, and 234, associated with corresponding cylinders in one of the cylinder banks of a V-type engine. Each intake cam 230, 232, 234 may actuate one or more intake valves as intake camshaft 12 rotates. The fuel pump/balancer cam 28 is a multiple-lobed cam with four lobes for actuating a fuel pump and balancer mechanism as previously described. Positioning a balancer or similar torsional management device for actuation by the same cam 26 as the fuel pump generally does not allow for optimal management of torsional loads on camshaft 12. However, as shown in the graphs of FIGS. 8-10, axial collocation of a balancer device and fuel pump with appropriate phasing according to the present disclosure may be used to significantly reduce peak torque disturbances associated with the camshaft-driven device to minimize impact on other engine components, such as a variable cam timing system and/or camshaft drive system, for example. For applications and implementations where additional torsional management is necessary or desired, a dedicated cam may be provided for actuation of a torsional management device as shown in the representative camshaft embodiment of FIG. 7.

Figure 7:
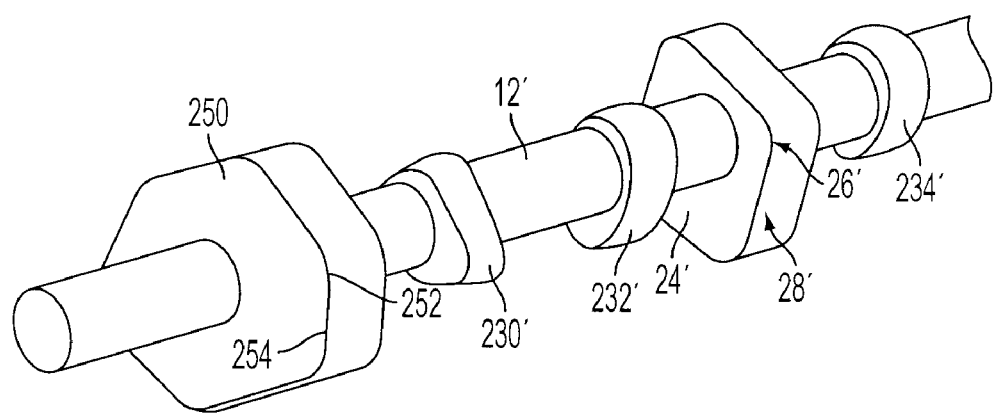
FIG. 7 illustrates an intake camshaft having a dedicated multiple-lobed cam for the balancer mechanism to manage torsional loading associated with an auxiliary device and optionally for managing torsional loading associated with actuation of intake valves according to the present disclosure.

In the alternative embodiment of camshaft 12' illustrated in the perspective view of FIG. 7, a dedicated cam 250 is provided to drive a torsional management device, such as balancer mechanism 40 (FIG. 1). Camshaft 12' includes valve actuation cams 230', 232', and 234' that may operate intake or exhaust valves associated with corresponding cylinders. In addition, camshaft 12' includes at least one auxiliary device cam 24' for operating a camshaft-driven auxiliary device, such as a fuel pump or water pump, for example. Cam 24' may be a multiple-lobed cam with lobes 26' extending from a base profile or lateral surface 28' with the number of lobes 26' determined by the operating requirements of the auxiliary device. Dedicated cam 250 may also have multiple lobes 252 extending from a base profile 254 with the number, shape, and position of lobes 252 determined by the particular torsional loading signature of camshaft 12', and the desired modification of the torsional signature. For example, the profile of dedicated cam 250 may be designed to moderate only those torque disturbances associated with driving cam 26'. Alternatively, the profile of cam 250 may be designed to moderate torque disturbances association with valve actuation cams 230', 232', and 234' in addition to torque disturbances associated with driving cam 26'.

FIGS. 8-10 are graphs illustrating management of camshaft torsional loading for an intake camshaft driving a high-pressure fuel pump in a gasoline-fueled, direct-injection, V-6 internal combustion engine. FIG. 8 is a bar graph illustrating peak positive and negative camshaft torques associated with the intake camshaft across representative crankshaft speeds. Data series 300 represents peak positive and negative camshaft torques associated with actuation of the intake valves while data series 302 represents peak positive and negative camshaft torques associated with actuation of the intake valves and the high-pressure fuel pump without a torsional management device. Data series 304 represents peak positive and negative camshaft torques with a balancer mechanism according to the present disclosure positioned at 132 degrees of camshaft rotation relative to the fuel pump as described herein. As shown in data series 304 of FIG. 8, a balancer mechanism according to the present disclosure reduces positive and negative torque disturbance magnitudes across substantially the entire operating range of the engine when compared to data series 302 associated with operation of the intake valves and fuel pump without a balancer. As described above, a balancer mechanism operating on a dedicated cam lobe rather than the same cam lobe as the fuel pump could be optimized to further reduce torque disturbances, but may be less desirable in terms of packaging, weight, cost, etc.

FIG. 9 is a graph illustrating torques applied to the fuel pump lobe of the intake camshaft operating under wide-open throttle (WOT) conditions at 5650 RPM for one engine cycle or two complete rotations of the crankshaft. Line 320 represents the torque contributions of the camshaft-driven high-pressure fuel pump as a function of camshaft angle in degrees. Line 322 represents the torque contributions of the balancer mechanism driven by the same cam as the fuel pump and line 324 represents the resultant or sum of the fuel pump and balancer torques. As shown in the graph of FIG. 9, the phased relationship of the balancer mechanism relative to the fuel pump results in the balancer mechanism applying advancing torque during at least a portion of camshaft rotation where the fuel pump applies retarding torque and vice versa resulting in reduced peak torque disturbances. As also shown in FIGS. 8-10, a balancer mechanism according to the present disclosure generally reduces the amplitude of torque disturbances associated with actuation of the fuel pump. However, because the balancer mechanism is driven by the fuel pump cam with a cam profile determined based on fuel pump operating parameters, there may be some angular orientations and/or rotational speeds during operation where the balancer mechanism does not moderate the torque disturbance. When averaged over the entire engine cycle and range of operating speeds, and particularly at higher engine speeds, however, peak torque disturbances are significantly reduced as illustrated and described.

FIG. 10 illustrates the torques required to drive the camshaft, including the loads of intake valve actuation, with the engine operating at WOT, 5650 RPM. Line 330 represents the torque required to drive a conventional intake camshaft that actuates the intake valves but is not fitted with a fuel pump or balancer. Line 332 represents the torque required to drive the valve actuating camshaft that has been fitted with a fuel pump, but no balancer. Line 334 represents the torque contribution of the balancer, and line 336 represents the torque required to drive a camshaft that actuates intake valves, the fuel pump, and a balancer.

As such, managing torsional loading associated with one or more camshaft-driven auxiliary devices according to the present disclosure reduces peak torsional disturbances and may reduce noise, vibration, and harshness while improving durability of associated engine components, such as the camshaft chain drive assembly, for example. Actuation of a balancer mechanism by the same cam that drives the auxiliary device allows for more compact packaging of the system and may provide an additional attachment point for the auxiliary device and/or other components to reduce vibration during operation. Actuation of a balancer mechanism by a dedicated cam allows optimization of the balancer cam profile to better manage torsional loading associated with the auxiliary device and provides the ability to counter torques associated with intake or exhaust valve actuation in addition to torques associated with the auxiliary device.

While the best mode has been described in detail, those familiar with the art will recognize various alternative designs and embodiments within the scope of the following claims. Various embodiments may have been described as providing advantages or being preferred over other embodiments or prior art implementations in regard to one or more desired characteristics. However, as one skilled in the art is aware, one or more characteristics may be compromised to achieve desired system attributes, which depend on the specific application. These attributes include, but are not limited to: cost, strength, durability, life cycle cost, marketability, appearance, packaging, size, serviceability, weight, manufacturability, ease of assembly, etc. Any embodiments described herein as less desirable relative to another embodiment or the prior art with respect to one or more characteristics are not outside the scope of the following claims.

What is claimed:

1. A system for managing camshaft loads comprising:
a spring-biased roller follower contacting the camshaft and operating in a phased relationship with an auxiliary device plunger to remove torque from the camshaft when the plunger adds torque, and to add torque to the camshaft when the plunger absorbs torque from the camshaft.

2. The system of claim 1 wherein the roller follower contacts the camshaft on the cam that drives the plunger.

3. The system of claim 2 wherein the cam that drives the plunger and the roller follower is a multiple-lift cam having four cam lobes.

4. The system of claim 1 wherein the auxiliary device comprises a fuel pump and wherein the camshaft includes a plurality of intake valve cams for operating corresponding intake valves and a fuel pump cam for operating the fuel pump, the system further comprising:
a balancing cam disposed on the camshaft and having multiple lobes disposed in phased relationship with the fuel pump plunger lobe and the intake valve lobes.

5. A camshaft balancer comprising: balancer:
support structure having a base and two spaced risers extending generally upward from the base;
a pivot arm having a first end pivotally mounted between the two risers and a second end having a roller for contacting a cam on a camshaft; and at least one spring disposed between the second end of the pivot arm and the base of the support structure.

6. The balancer of claim 5 wherein the at least one spring comprises a plurality of springs nested one within another.

7. The balancer of claim 5 wherein the risers include a portion extending beyond the pivot arm for securing a bottom portion of an auxiliary device disposed therebetween.

8. A multiple-cylinder internal combustion engine having a high-pressure fuel pump with a spring-biased plunger driven by a multiple-lobed cam on a camshaft, the engine comprising:
 a spring-biased device in contact with the multiple-lobed cam that drives the fuel pump plunger, the device positioned to be displaced away from the cam as the fuel pump plunger moves toward the cam, and to be displaced toward the cam as the fuel pump plunger moves away from the cam to manage torsional loading of the camshaft.

9. The engine of claim 8 wherein the spring-biased device contacts a multiple-lobed cam disposed on a camshaft that actuates intake valves for each cylinder of the engine.

10. The engine of claim 8 wherein the multiple-lobed cam comprises four lobes.

11. An engine having a high-pressure fuel pump with a spring-biased plunger driven by a camshaft lobe, the engine comprising a balancer including:
 a support structure having two spaced apart support arms extending from a base secured to a cylinder head of the engine;
 a finger follower pivotally secured to the support arms by a pin extending therebetween and through a hole in a first end of the finger follower, the finger follower having a roller rotatably secured to a second end thereof;
 at least one spring disposed between the finger follower and the base of the support structure for biasing the roller to contact the multiple-lobed cam.

12. The engine of claim 11 wherein the at least one spring comprises a plurality of nested springs having alternating winding directions to resist entanglement.

13. The engine of claim 11 wherein the support arms of the support structure extend beyond the finger follower and include a through hole for securing an extension of the fuel pump between the support arms.

14. The engine of claim 11 wherein the support structure is secured to the cylinder head between adjacent cylinders of the engine.

15. A method for managing torsional loading of a camshaft in an internal combustion engine having a fuel pump plunger driven by a cam on the camshaft, the method comprising:
 applying torque to the cam driving the fuel pump plunger using a resiliently biased cam follower in a phased relationship relative to the fuel pump plunger such that a positive torque is applied during at least a portion of camshaft rotation when the fuel pump plunger is applying a negative torque, and a negative torque is applied during at least a portion of camshaft rotation when the fuel pump plunger is applying a positive torque to manage torsional loading of the camshaft.

16. The method of claim 15 wherein applying torque to the camshaft comprises applying torque using the cam follower at a different cam on the camshaft than the cam that drives the fuel pump plunger.

17. The method of claim 15 wherein applying torque to the camshaft comprises biasing the cam follower using at least one spring.

18. The method of claim 15 wherein applying torque to the camshaft comprises:
 pivotally supporting a finger follower at one end from a base structure secured to the engine;
 biasing a roller on a second end of the finger follower to contact a cam on the camshaft using a plurality of springs disposed between the finger follower and the base structure.

* * * * *